United States Patent [19]

Smith

[11] 4,109,524
[45] Aug. 29, 1978

[54] METHOD AND APPARATUS FOR MASS FLOW RATE MEASUREMENT
[75] Inventor: James E. Smith, Boulder, Colo.
[73] Assignee: S & F Associates, Boulder, Colo.
[21] Appl. No.: 591,907
[22] Filed: Jun. 30, 1975
[51] Int. Cl.² ............................................. G01F 1/80
[52] U.S. Cl. .................................................. 73/194 B
[58] Field of Search .............. 73/194 R, 194 M, 32 R, 73/32 A, 194 B

[56] References Cited

U.S. PATENT DOCUMENTS

| 3,080,750 | 3/1963 | Wiley et al. | 73/194 M |
| 3,218,851 | 11/1965 | Sipin | 73/194 M |
| 3,329,019 | 7/1967 | Sipin | 73/194 B |
| 3,396,579 | 8/1968 | Souriau | 73/194 B |
| 3,485,098 | 12/1969 | Sipin | 73/194 B |

*Primary Examiner*—Richard C. Queisser
*Assistant Examiner*—John P. Beauchamp
*Attorney, Agent, or Firm*—O'Rourke & Harris

[57] ABSTRACT

Method and apparatus for measuring mass flow rate of a fluid substance flowing in a conduit by reciprocating a section of conduit at an end thereof with the other end thereof pivotally mounted, and measuring the torque generated by the Coriolis force, and preferably reciprocating two similar sections of conduit at the inlet end of one and the outlet end of the other, both being pivotally secured at the nonreciprocated ends, to substantially balance inertial forces, the torque preferably being measured at peak angular velocity of the conduit section.

9 Claims, 8 Drawing Figures

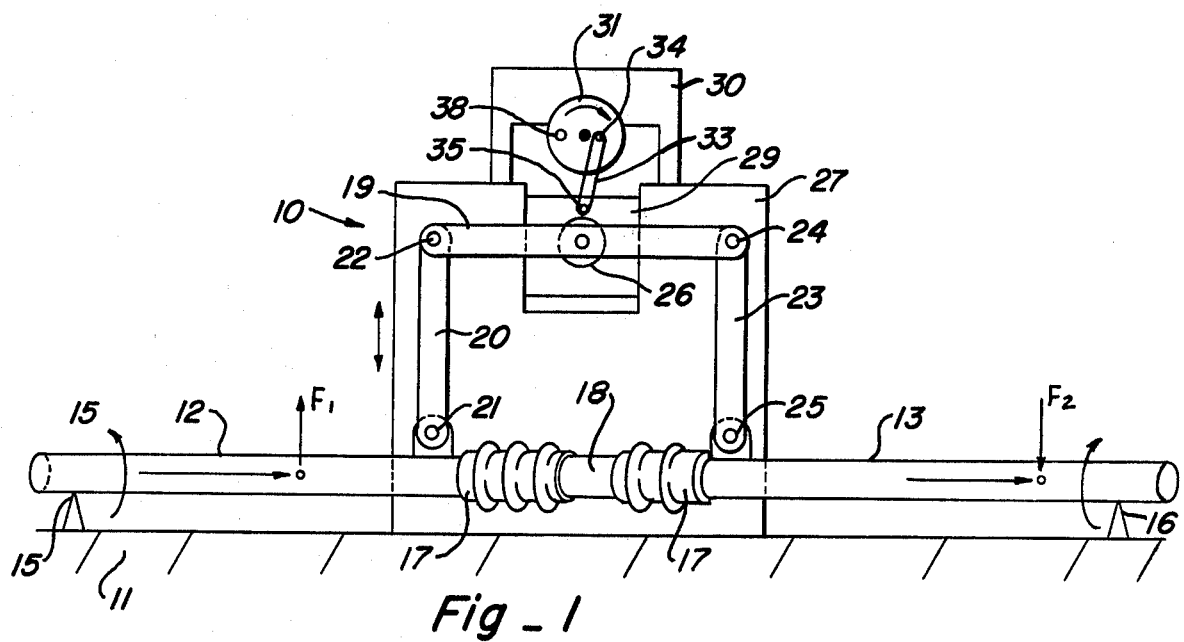
Fig_1
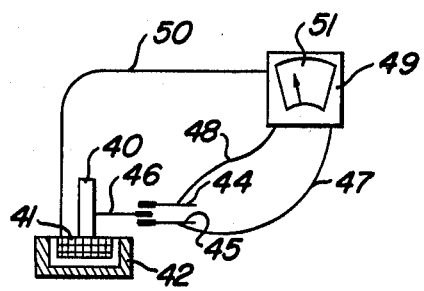
Fig_2
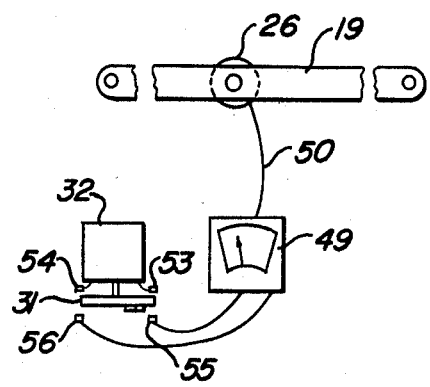
Fig_3

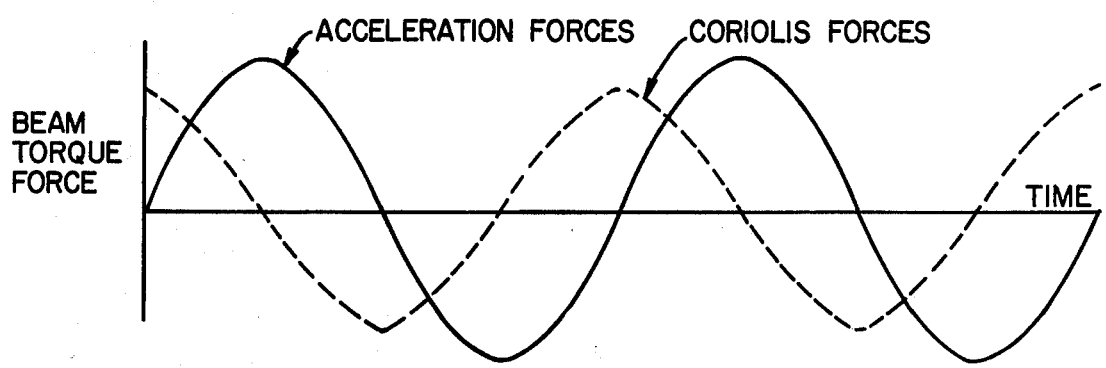
Fig_4
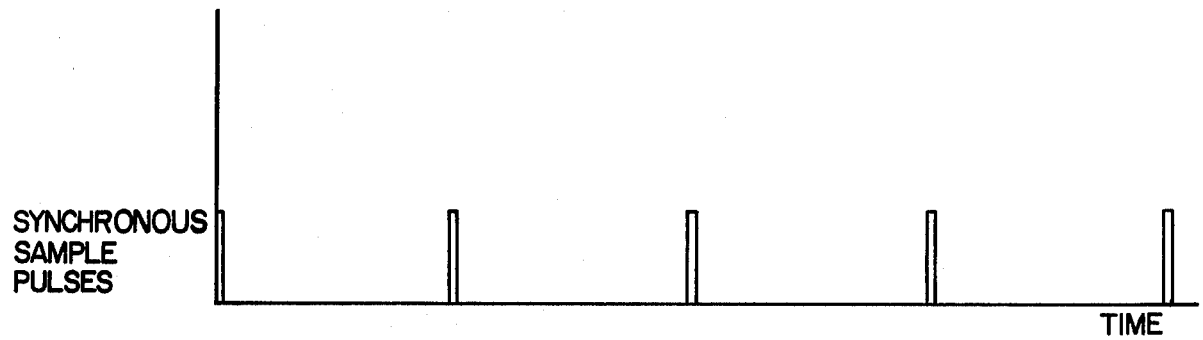
Fig_5
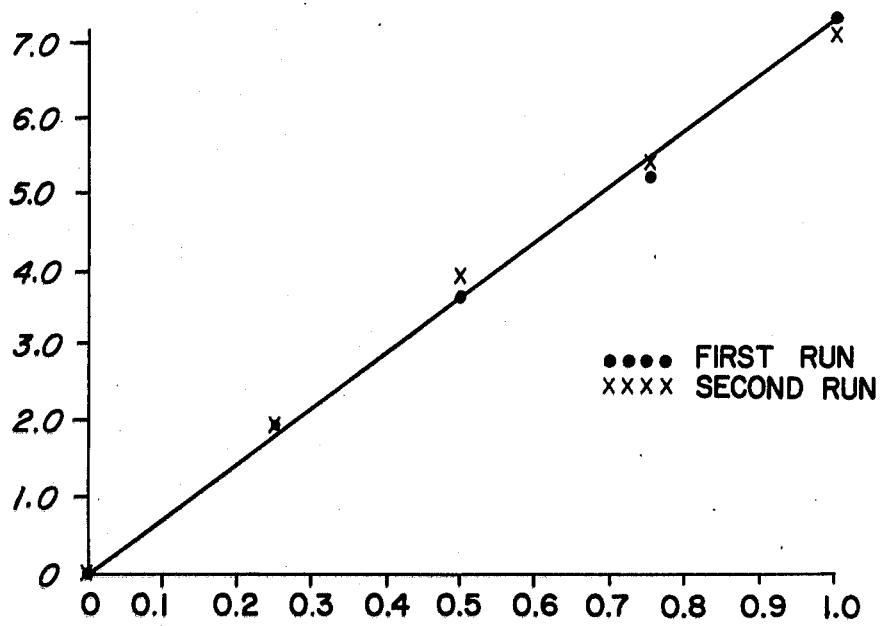
Fig_6

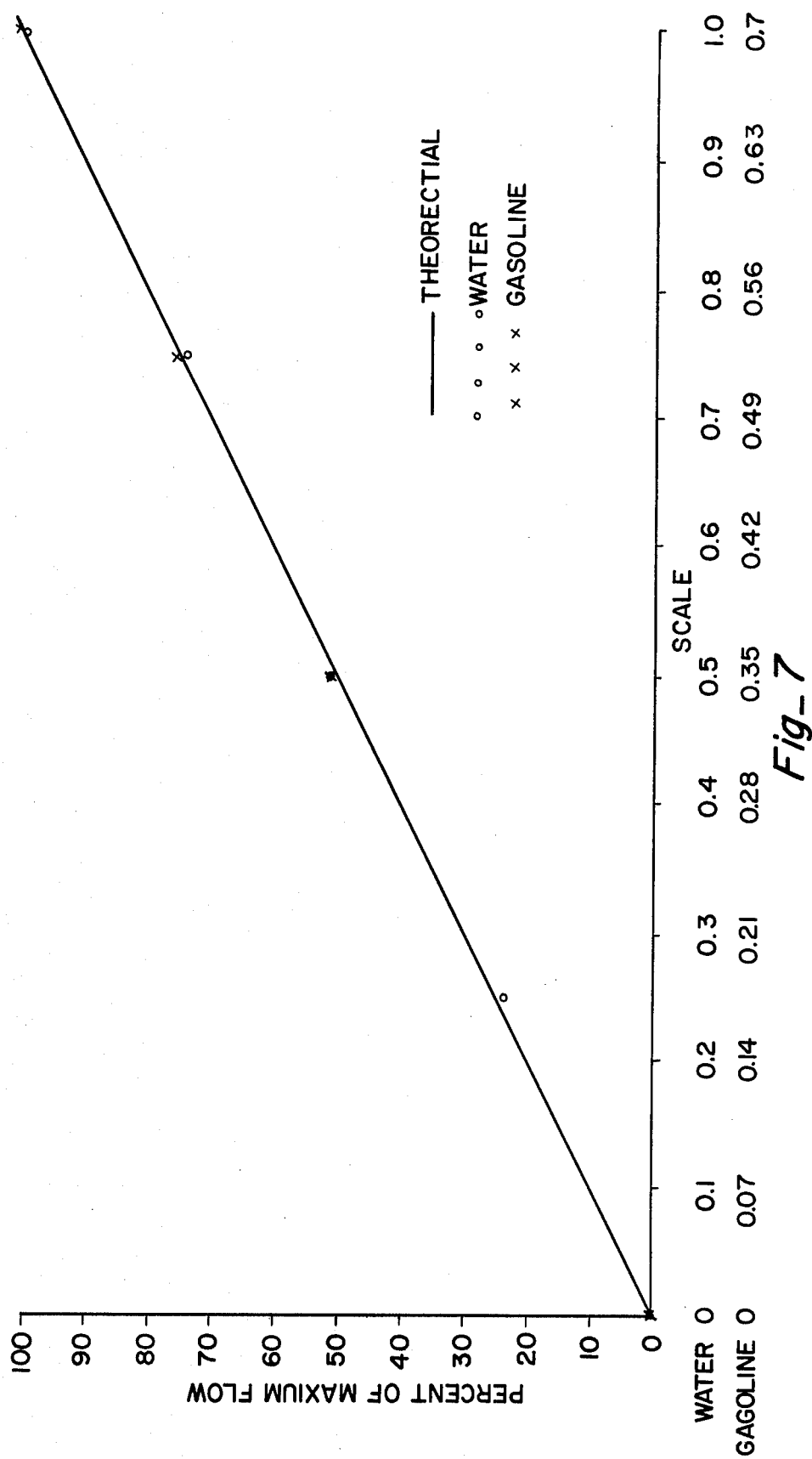
Fig_7

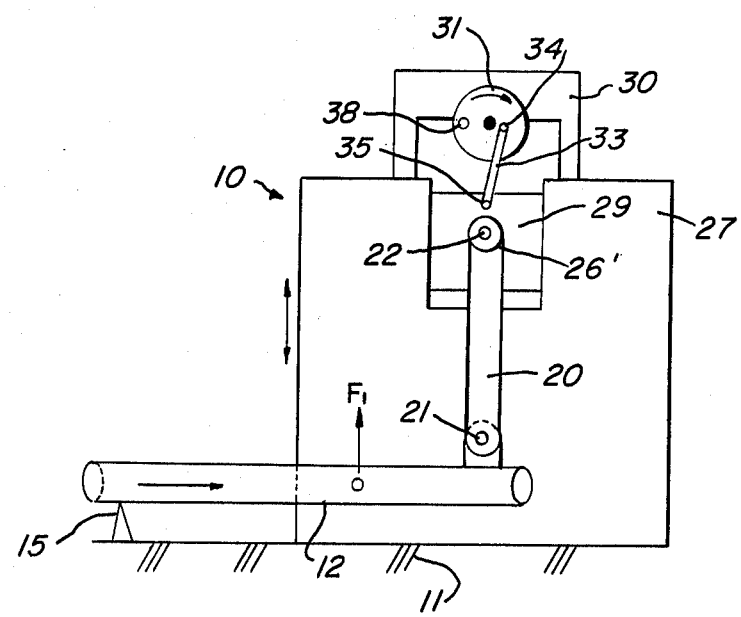
Fig_8

METHOD AND APPARATUS FOR MASS FLOW RATE MEASUREMENT

BACKGROUND OF THE INVENTION

1. Field of the Invention

The present invention relates generally to mass flow rate measuring methods and devices, and more particularly to a method and device for measuring mass flow rate utilizing conduit sections angularly rotated in a reciprocating manner.

2. Description of Prior Art

The necessity and desirability of determining the mass flow rate of a fluid through a conduit has been recognized for some time. Heretofore, numerous indirect or complicated means for determining mass flow rates have been utilized. In most cases, this involved a two step determination i.e., first a density determination and thereafter a fluid velocity determination. Usually, velocity determinations required the inclusion of a member i.e., pitot tube, propeller, orifice, etc. in the fluid stream, thereby exposing the measuring device to the material being measured. This approach is troublesome with regard to many fluids, for instance corrosive fluids such as molten sodium used for cooling purposes, cryogenics, fluids under high pressures or other extreme conditions, and chemically reactive fluids. Further, such devices often were not linear and required involved calibration procedures or charts.

More recently, devices have been provided for external determinations of flow rates. However, this has been accomplished only through complicated devices such as those utilizing an oscillating loop in a pipe and other such involved approaches which often substantially obstructed flow of the fluid substance being measured.

SUMMARY OF THE INVENTION

The present invention, which provides a heretofore unavailable improvement over previous mass flow rate measuring devices and methods, comprises a means for determining the mass flow rate of a fluid flowing in a conduit. By reciprocating a section, and preferably a pair of sections, to provide a longitudinal angular rotation of the section, a particularly useful force couple directly proportional to mass flow rate through the conduit is produced. By measuring the force couple in a highly selected manner, a linear output indicative of the mass flow rate through the conduit is provided.

Accordingly, an object of the present invention is to provide a new and improved method and device for measuring mass flow rate of a fluid through a conduit.

Another object of the present invention is to provide a new and improved method and apparatus for measuring fluid flow through a conduit as a direct and true measurement of mass flow rate.

Yet another object of the present invention is to provide a new and improved method and apparatus for measuring fluid mass flow rate which provides a substantially linear output proportional to the mass flow rate.

Still another object of the present invention is to provide a new and improved method and apparatus for measuring fluid mass flow rate which does not substantially inhibit flow of the fluid through the apparatus.

Still yet, another object of the present invention is to provide a new and improved method and apparatus for measuring fluid flow which requires no moving parts emersed in the flowing fluid.

A further object of the present invention is to provide a new and improved method and apparatus for measuring fluid mass flow in a simple, direct and straight forward manner with minimal influence of the measurement upon the fluid flowing.

These and other objects and features of the present invention will be apparent from the following description.

BRIEF DESCRIPTION OF THE DRAWINGS

In the drawing

FIG. 1 is a simplified view of an apparatus in accord with the present invention;

FIG. 2 is a schematic presentation of a known force generating and measuring means particularly useful in the present invention;

FIG. 3 is a simplified diagram of the readout portion of an apparatus in accord with the present invention;

FIG. 4 is a phase diagram of the more significant forces involved in the device of FIG. 1;

FIG. 5 is a diagram of the signals generated utilizing the abscissa reference as the diagram of FIG. 4;

FIG. 6 is a graph of the actual and measured flow rates utilizing an apparatus in accord with the present invention;

FIG. 7 is a graph of the flow rates of two fluids of differing densities measured utilizing an apparatus in accord with the present invention; and FIG. 8 is a view similar to that of FIG. 1 illustrating a single conduit embodiment of the invention.

DETAILED DESCRIPTION OF THE INVENTION

Turning now to the drawings, wherein like components are designated by like reference numerals throughout the various figures, a device for determining and indicating the mass flow rate of a fluid through a conduit is illustrated in FIG. 1 and generally designated by the reference numeral 10. Device 10 is carried on support 11 and includes first conduit 12 and second conduit 13 pivotally mounted to support 11 at pivot 15 and pivot 16 respectively. The adjacent portions of first conduit 12 and second conduit 13 are connected for movement and flow by, for example, flexible coupling 17 and center connector 18. Beam 19 is positioned substantially parallel to and spaced from first conduit 12 and second conduit 13 and connected by link 20 attached to first conduit 12 at pivot 21 and to beam 19 at pivot 22, and link 23 is similarly attached to first conduit 12 at pivot 25 and to beam 19 at pivot 24. Beam 19 is attached to and supported centrally by torque sensor 26 which will be explained in more detail with regard to FIG. 2.

Housing 27 is also carried on support 11 and includes floating member 29 mounted for free vertical movement in housing 27. Torque sensor 26 is carried on floating member 29.

Motor support 30 is secured to and extends above housing 27 and carries flywheel 31 attached to motor 32 as shown in FIG. 3. Rod 33 is eccentrically mounted to flywheel 31 at pivot 34, and, at the other end, mounted to floating member 29 at pivot 35. Opening 38 is defined in flywheel 31 along the diameter including eccentric pivot 34.

Thus, as flywheel 31 rotates, eccentrically mounted rod 33 will reciprocate floating member 29 and, through beam 19 and links 20 and 23, reciprocate first conduit 12 and second conduit 13 around pivots 15 and 16. This will induce a reciprocating angular motion at first conduit 12 and second conduit 13. Fluids traveling through first conduit 12 and second conduit 13 will create coriolis forces $F_1$ and $F_2$ in first conduit 12 and second conduit 13, respectively, which are opposed in direction. Opposed forces $F_1$ and $F_2$ will induce a force moment around beam 19 which is nulled and measured by torque sensor 26. The magnitude of forces $F_1$ and $F_2$ are directly proportional to the mass flow rate of the fluid through conduits 12 and 13.

Of course, any unbalance between first conduit 12 and second conduit 13, and associated linkages, will produce forces which may be of a magnitude greater than that of the $F_1$ and $F_2$ forces. However, the unbalanced forces are a function of acceleration whereas forces $F_1$ and $F_2$ are a function of angular velocity. In the sinusoidal reciprocation of device 10, the angular velocity will be at its greatest when the acceleration forces are zero since, quite clearly, the angular acceleration is the first derivative of the angular velocity. Accordingly, by providing torque sensor 26 with a means, as will be described below, for sensing the force moment of beam 19 only when the acceleration forces are substantially zero, it is possible to avoid the spurious acceleration forces and measure substantially only the desired coriolis forces when the latter are at a maximum.

The principle of an electronic torque sensor 26 is illustrated by the quite simple diagram of FIG. 2. An armature 40 having a coil 41 wound thereon is suspended within a permanent magnet 42. Upper and lower fixed condensor plates 44 and 45 are associated with moveable condensor plate 46 carried on armature 40. Accordingly, as armature 40 moves the movement and sense of movement are provided by wires 47 and 48 to control means 49 as a variation in capacitance. In response, control means 49 provides a current through wire 50 to coil 41 to maintain moveable condensor plate 46 in a predetermined relationship relative to fixed condensor plates 44 and 45. The current required to produce a force sufficient to maintain armature 40 in a predetermined position is measured and displayed at readout 51. Such measuring devices are well-known in the art as illustrated by U.S. Pat. No. 3,680,650 and numerous other patents. Though illustrated in FIG. 2 as measuring and offsetting a linear force, this simple approach, in conjunction with a moment arm (not shown) would provide a functional torque sensor 26. A direct torsional or rotational movement may also be provided using the principle of commonly found in electric motors. Also, inductance or resistance can be varied rather than capacitance to measure the beam position.

As shown in FIG. 3, flywheel 31 is driven by motor 32. Light sources 53 and 54 are provided on one side of flywheel 31, such sources preferably being LED's, and photosensors 55 and 56 are provided on an opposite side of flywheel 31 in alignment with light sources 53 and 54. Accordingly, when opening 38 defined in flywheel 31 is in a horizontal plane, the acceleration imposed by rod 33 upon floating member 29, and accordingly upon first conduit 12 and second conduit 13, is zero while the angular velocity of first conduit 12 and second conduit 13 is maximum. At this time, photosensor 55 or 56 is activated and provides control means 49 with a signal indicating the optimum time to accept a reading from torque sensor 26. Thus, each time opening 38 passes photosensor 55 or photosensor 26, control means 49 accepts a signal from torque sensor 26 and provides a readout at 51. Of course, the same result can be obtained with proximity detectors, micro switches, or any of the other many position sensing means available to the art. Also, two holes defined in flywheel 31 will produce the same result with but one photosensor and one aligned light source, i.e., light source 53 and photosensor 55.

The significance of the mechanisms of FIGS. 1 through 3 will be more readily understood with reference to FIGS. 4 and 5. As shown, the forces due to acceleration of conduits 12 and 13 are out of phase with the forces due to the coriolis effect, and the acceleration forces are zero when the coriolis force is greatest. Accordingly, as shown in FIG. 5, sensor 26 provides an output corresponding to the force moment imposed upon torque beam 19 only at those select positions at which the coriolis force is maximum and the accleration force is zero. Other forces, such as the torque induced by flexible couplings 17, are also zero or minimized when in the undistorted position at which the coriolis forces are measured.

To confirm the theoretical aspects discussed above, apparatus functionally identical to device 10 was prepared and water was flowed through the device at several flow rates established by means of a container of a known volume and a stopwatch. Meter readings were taken at four different established flow rates. The measurement was twice made. As shown in FIG. 6, the meter readings (without benefit of scale factor), illustrated as the abscissa, and measured flow rates, illustrated as the ordinate, are substantially linear. Accordingly, a fixed scale factor will readily suffice to convert the meter readings to actual mass flow rates rather than the complicated nonlinear correlations usually found in flow meters operating at different flow rates.

As presented in FIG. 7, a linear relationship between percent of maximum flow and the meter scale reading was established for water in the manner described with reference to FIG. 6. The scale readings for water were corrected by a factor of 0.7, the specific gravity of gasoline, and flow rates of gasoline was established which produced the corrected scale readings. When measured, the actual flow rates of the gasoline were identical to the corresponding flow rates for water as shown in FIG. 7.

Though, for obvious reasons, the twin conduit embodiment described above is the preferred embodiment, a single rotated and reciprocating conduit is of course functional. A single conduit embodiment is illustrated in FIG. 8. Basically, the embodiment of FIG. 8 is quite similar to that of FIG. 1, as is apparent from the many identical components identified by identical numerals. However, as shown, link 20 is connected directly to sensor 26'. Sensor 26' is a direct force sensor, as shown in FIG. 2, which is activated for readout purposes only when angular velocity is substantially maximum in a manner identical to that discussed above with regard to the embodiment of FIG. 1. Since a simple single conduit is inherently unbalanced, it is important that measurements be made in this manner. A simple unbalanced counterweight, for instance, could be utilized to offset the out of balance forces which would result from reciprocating a single conduit. Also, though the conduits are shown as being in axial alignment, it is of course possible to position them in a side by side relationship with the flexible coupling forming the bottom of a "U". In this configuration the conduits would oscillate in the same instantaneous direction but the flow in each conduit would be opposite. However, this compromises an important advantage of the instant invention is that some resistance to flow would be induced by a "U" shaped arrangement. In the case of gaseous fluids, a pressurized enclosure would permit the first and second conduits to merely be aligned with the gases flowing from one to the other without resort to a flexible coupling. Particularly in fluid logic, a number of provisions are available to permit gaseous flow from one conduit to another through an unconstrained volume.

Reference to "fluids" herein is not intended to be limited to classical fluids, i.e., liquids and gases, but also includes "fluidized" or particulate solids flowing through a conduit.

Although only one embodiment of the present invention has been illustrated and described, it is anticipated that various changes and modifications will be apparent to those skilled in the art, and as such, changes may be made without parting from the scope of the invention as defined by the following claims.

What is claimed is:

1. Apparatus for measuring fluid mass flow comprising: first and second conduit sections each having inlet and outlet ends with the outlet end of the first conduit section and the inlet end of the second conduit section being adjacent, the first conduit section being pivotally mounted adjacent the inlet end and the second conduit section being pivotally mounted adjacent the outlet end, first means providing for flow and movement between the adjacent outlet end of the first conduit section and the inlet end of the second conduit section, second means for providing reciprocal angular rotation of the conduit sections in mirror image fashion around the pivoted ends thereof, and third means for measuring the force moment between the conduit sections resulting from the Coriolis forces induced by fluid flowing through the conduit sections.

2. Apparatus as set forth in claim 1 in which the means for measuring the force moment comprise electromagnetic means providing a counterbalancing force moment and which provides a readout as a function of the current required to produce such counterbalancing force moment.

3. Apparatus as set forth in claim 1 further including switching means for intermittently activating the means for measuring the force moment substantially only when the angular velocity around the pivoted ends of the conduits is maximum.

4. Apparatus for measuring fluid mass flow comprising: first and second conduit sections having inlet and outlet ends, the first conduit section being pivotally mounted at the inlet end and the second conduit section being pivotally mounted at the outlet end, a flexible coupling connecting the outlet end of the first conduit section and the inlet end of the second conduit section, a beam connected to the outlet end of the first conduit section and the inlet end of the second conduit section, means for reciprocating the beam and the attached ends of the conduit section in a direction substantially perpendicular to the axial directions of the conduit section, and means for measuring the torque induced in the beam as a result of the coriolis force generated in the conduit sections upon flow of fluids therethrough.

5. Apparatus for measuring fluid mass flow as set forth in claim 4 in which the means for reciprocating the beam is a rotatable flywheel eccentrically attached to the beam.

6. Apparatus as set forth in claim 4 in which switching means connected to intermittently disable the torque measuring means are provided to accept measurements of the torque imposed upon the beam substantially only when the angular velocity of the conduit sections is maximum.

7. Apparatus for measuring fluid mass flow comprising:
at least one conduit section pivotally mounted at one end and free to move angularly about the pivotal mounting, means to reciprocatively rotate the conduit means around the pivotal mounting, selectively activatable means to measure the Coriolis force induced in the conduit section, and switching means connected to the selectively activatable means to selectively activate the selectively activatable means when the angular velocity of the reciprocating conduit section is substantially maximum.

8. A method for measuring fluid mass flow through a conduit comprising: inducing fluid flow through at least one conduit section, angularly oscillating at least the one section of the conduit around a pivot point located at an end of the conduit section, and intermittently measuring the torque induced in the conduit section by the fluid flow when the angular velocity of the conduit section is maximum.

9. A method for measuring fluid mass flow as set forth in claim 8 further comprising: flowing the fluid from the outlet end of the first, oscillating conduit section to the inlet end of a second, adjacent conduit section, angularly oscillating both conduit sections in mirror-image fashion, the first conduit section being oscillated around the fluid inlet end and the second conduit section being oscillated around the fluid outlet end, and measuring the torque across the adjacent outlet end of the first conduit section and the inlet end of the second conduit section.

* * * * *